(12) United States Patent
Simpson et al.

(10) Patent No.: US 7,706,019 B2
(45) Date of Patent: *Apr. 27, 2010

(54) CONSUMABLE RESOURCE OPTION CONTROL

(75) Inventors: Shell S. Simpson, Boise, ID (US); Jeetendra Kumar, Boise, ID (US); Travis N. Moats, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1704 days.

This patent is subject to a terminal disclaimer.

(21) Appl. No.: 10/876,933

(22) Filed: Jun. 25, 2004

(65) Prior Publication Data

US 2005/0286064 A1 Dec. 29, 2005

(51) Int. Cl.
*H04N 1/60* (2006.01)
*B41J 29/38* (2006.01)
*B41J 2/205* (2006.01)
*G03G 15/00* (2006.01)

(52) U.S. Cl. .............................. 358/1.9; 347/9; 347/15; 399/84

(58) Field of Classification Search ........................ None
See application file for complete search history.

(56) References Cited

U.S. PATENT DOCUMENTS

| | | |
|---|---|---|
| 4,771,295 A | 9/1988 | Baker et al. |
| 4,961,088 A | 10/1990 | Gilliland et al. |
| 5,146,236 A | 9/1992 | Hirata et al. |
| 5,506,611 A | 4/1996 | Ujita et al. |
| 5,610,635 A | 3/1997 | Murray et al. |
| 5,620,641 A | 4/1997 | Berger |
| 5,642,143 A | 6/1997 | Rhoads |
| 5,798,777 A | 8/1998 | Yoshimura et al. |
| 5,821,967 A | 10/1998 | Solero |
| 5,861,901 A | 1/1999 | Kashimura et al. |
| 5,870,119 A | 2/1999 | Chen et al. |
| 6,109,723 A | 8/2000 | Castle et al. |
| 6,145,950 A * | 11/2000 | Ohtsuka et al. ............... 347/15 |
| 6,158,837 A | 12/2000 | Hilton et al. |
| 6,196,665 B1 | 3/2001 | Weeks |
| 6,203,139 B1 | 3/2001 | Beauchamp |
| 6,250,735 B1 | 6/2001 | Kaneko et al. |
| 6,250,750 B1 | 6/2001 | Miyazawa et al. |
| 6,270,184 B1 | 8/2001 | Igarashi et al. |
| 6,293,662 B1 | 9/2001 | Shihoh et al. |
| 6,309,045 B1 | 10/2001 | Suzuki et al. |
| 6,318,828 B1 * | 11/2001 | Barbour et al. ................ 347/9 |
| RE37,671 E | 4/2002 | Pinkernell et al. |

(Continued)

FOREIGN PATENT DOCUMENTS

EP 0 720 916 7/1996

(Continued)

*Primary Examiner*—Twyler L Haskins
*Assistant Examiner*—Barbara D Reinier

(57) ABSTRACT

An image-printing device includes a connection bay that accepts an insertable consumable resource. The consumable resource includes an option key that identifies at least one mode of operation associated with the consumable resource. The connection bay outputs at least one signal associated with the mode of operation when the consumable resource is inserted. A controller receives the signal associated with the mode of operation and in response outputs display information suitable for use by a display to indicate a selectable availability of the at least one mode of operation.

32 Claims, 7 Drawing Sheets

U.S. PATENT DOCUMENTS

| | | |
|---|---|---|
| 6,378,987 B2 | 4/2002 | Balakrishnan et al. |
| 6,412,911 B1 | 7/2002 | Hilton et al. |
| 6,454,381 B1 | 9/2002 | Olsen et al. |
| 6,460,984 B1 | 10/2002 | Matsumoto et al. |
| 6,471,334 B2 | 10/2002 | Kline et al. |
| 6,474,802 B1 | 11/2002 | Lui |
| 6,481,829 B1 | 11/2002 | Bailey et al. |
| 6,502,917 B1 | 1/2003 | Shinada et al. |
| 6,744,527 B1 * | 6/2004 | Dorsey et al. ............... 358/1.12 |
| 7,268,897 B1 * | 9/2007 | Moro et al. ................ 358/1.13 |
| 2003/0053815 A1 * | 3/2003 | Testardi et al. ................ 399/79 |
| 2003/0095811 A1 * | 5/2003 | Haines ........................ 399/84 |
| 2004/0046985 A1 * | 3/2004 | Watanabe et al. .......... 358/1.13 |
| 2004/0246503 A1 * | 12/2004 | Silverbrook ................ 358/1.1 |

FOREIGN PATENT DOCUMENTS

| | | |
|---|---|---|
| EP | 0 721171 | 6/2000 |
| EP | 0 691 207 | 11/2001 |
| EP | 0 789 322 | 11/2002 |
| WO | WO 01/32431 | 5/2001 |

\* cited by examiner

122

OPTION CONTROL DATA

| OPTION | STATE |
|---|---|
| 1 | PRINT MODE 1 | SHOW |
| 2 | PRINT MODE 2 | HIDE |
| ... | ... | ... |
| N | ... | ... |

FIG. 3

CONSUMABLE RESOURCE OPTION CONTROL

The present application is related to U.S. patent application Ser. No. 10/876,934, filed with the same date herewith by Shell S. Simpson, Jeetendra Kumar and Travis N. Moats, and having the same title, the full disclosure of which is hereby incorporated by reference.

BACKGROUND

Image-forming systems, such as printers and copiers, typically form images by depositing ink or toner upon a print medium, such as paper. Many systems offer a multitude of printing techniques or modes of operation from which the user must choose to form the image. Faced with such a large number of choices, an uninformed user may select an image forming mode that is not optimum for the user's printing objectives or those objectives of a vendor supplying the system to the user.

BRIEF DESCRIPTION OF THE DRAWINGS

FIG. 3 is a schematic illustration of an option key memory of the image-forming system of FIG. 2 according to an exemplary embodiment.

DETAILED DESCRIPTION OF EXAMPLE EMBODIMENTS

Figure 1:
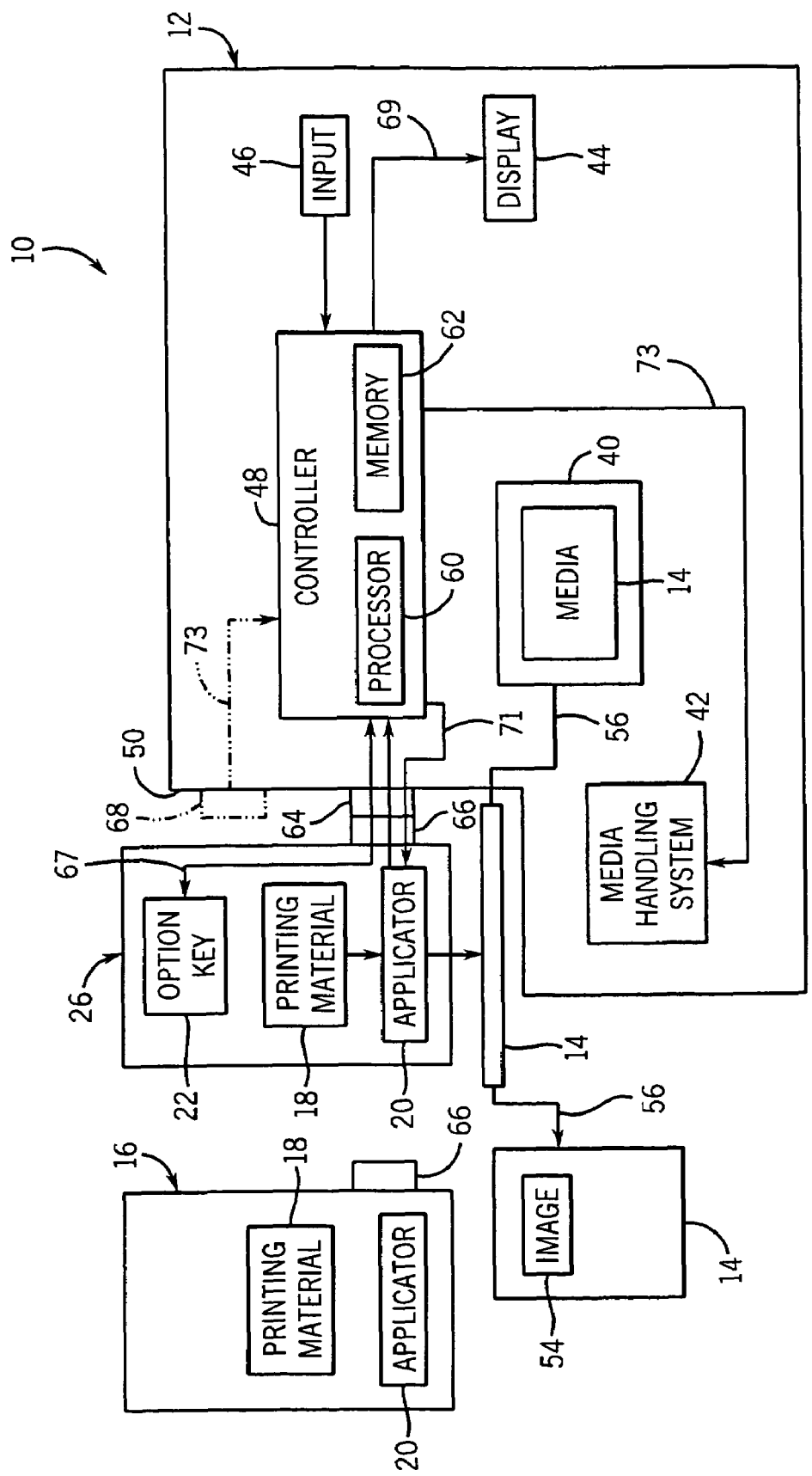
FIG. 1 is a schematic illustration of an image-forming system according to an exemplary embodiment.

FIG. 1 schematically illustrates image-forming system 10 which includes image-forming device 12, media 14, consumable resource unit 16 and consumable resource option control unit 26. As will be described in greater detail hereafter, unit 16 and 26 each include printing material 18 and applicator 20. Unit 26 additionally includes option key 22 which serves as a key to authorize image-forming device 12 to display the availability of an additional optional printing mode or technique and to use the optional mode or technique if chosen by a user.

Image-forming device 12 is a device configured to print or otherwise form an image upon media 14 using printing material 18 and using a first printing mode or a second optional printing mode as made available as a choice to a user of device 12 based upon whether unit 16 or unit 26 is connected to device 12. Device 12 generally includes media bay 40, media handling system 42, display 44, input 46, controller 48 and unit connection bay 50. Media bay 40 is configured to store media 14 until moved by media handling system 42 or to facilitate the inputting of media 14 to media handling system 42. In one embodiment, bay 40 may comprise a slot or opening configured to receive one or more sheets of media 14. In another embodiment, bay 40 may comprise an internal cavity or a drawer configured to receive a stack of media 14. In yet another embodiment, bay 40 may comprise a device configured to support a roll or bundle of media 14.

Media 14 may comprise sheets or rolls of material upon which printing material 18 is to be deposited or applied to form image 54. Media 14 may include polymers, cellulose, other materials or combinations thereof.

Media handling system 42 comprises a mechanism to manipulate media 14 within device 12. Media handling system 42 transports media 14 from bay 40 relative to applicator 20 of units 16 or 26 and to discharge media 14 from device 12 after image 54 has been formed upon media 14. Media handling system 42 may include a series of motor driven rollers or belts configured and arranged to grasp media 14 and to move media 14 along a path 56 relative to applicator 20 of unit 16 or 26 connected by bay 50.

Display 44 comprises one or more mechanisms configured to indicate to a person using device 12 those options that the person may select from for differing printing modes or techniques. In one embodiment, display 44 comprises an LCD screen that lists various options that the user may choose from in a menu format. In another embodiment, display 44 may include other visual indicators such as LEDs or other surfaces that light up or change color depending upon those options available to the person for printing. In still other embodiments, display 26 may utilize other visual or auditory indicators.

Display 44 is operably associated with controller 48. In one embodiment, display 44 is built in as a physical part of the overall unit or structure housing controller 48. In another embodiment, display 44 may be provided as part of a distinct unit or device wired to controller 48 or operably coupled to controller 48 wirelessly. In one embodiment, display 44 may be operably coupled to controller 48 via a network, such as a local area network or via the internet.

Input 46 comprises a mechanism configured to enable a user to specifically select one or more of the available options indicated by display 44. In one embodiment, user input 46 may be incorporated as part of display 44 in the form of a touch screen. In another embodiment, user input 46 may comprise push buttons, a keyboard, a mouse, sliding mechanisms, levers or other physical interaction devices. In still another embodiment, user input 46 may include a microphone and voice recognition software or circuitry, allowing the user to verbally select one or more of the options indicated by display 44.

Controller 48 comprises a device configured to communicate with applicator 20 of units 16, 26, media handling system 42, display 44 and input 46. Controller 48 generates control signals that direct the operation of applicator 20, media handling system 42 and display 44. When unit 26 is connected to device 12, controller 48 further communicates with and receives signals from option key 22.

Controller 48 generally includes a processor 60 and a memory 62. Processor 60 executes sequences of instructions contained in memory 62. Execution of the sequences of instructions causes processor 60 to perform steps such as analyzing signals from option key 22 and input 46 as well as generating control signals for applicator 20, media handling system 42 and display 44.

Memory 62 comprises one or more structures configured to store contained data and/or instructions for use by controller 48. Memory 62 may include one or more of programmable read-only memory, non-erasable read-only memory or random access memory. Memory 62 may comprise digital memory in the form of hardwired circuitry or may comprise fixed or portable memory such as optical memory (e.g., CDs, DVDs), magnetically encodable memory (e.g., tape, floppy disk) or other forms. Memory 62 contains logic or instructions otherwise known as code, which is used by processor 60 to generate control signals.

In the particular embodiment shown, memory 62 includes communication logic, option logic and printing logic. The communication logic comprises processor readable instructions for the generation of control signals to direct communication with applicator 20, option key 22, media handling system 42, display 44 and input 46. For example, based upon such communication logic, processor 60 generates control signals that cause communication interface 64 of bay 50 to detect when unit 16 or unit 26 is positioned within bay 50 and to receive data from option key 22 when unit 26 is connected.

The option logic comprises readable instructions that are used by processor 60 to evaluate option control data received from unit 26. The option logic further instructs processor 60 to generate control signals causing display 44 to indicate available options based upon the evaluation of any option control data. The option logic also instructs processor 60 to generate control signals directing media handling system 42 and/or applicator 20 to print image 54 upon media 14 using the optional printing mode made available by option key 22 when unit 26 is connected to device 12 and when the optional printing mode is selected by a user with input 46.

The printing logic comprises processor readable instructions that are used by processor 60 to generate control signals that cause applicator 20 and/or media handling system 42 to cooperate with one another to form image 54 upon medium 14 using either a first printing mode or a second optional printing mode made available by option key 22.

Unit connection bay 50 generally comprises that portion of device 12 configured to receive either unit 16 or unit 26 such that option key 22 is connected to communication interface 64 of device 12 and such that applicator 20 is located relative to media path 56 for depositing either printing material 18 or printing material 28 upon media 14. In one embodiment, connection bay 50 may be stationary relative to media path 56. In another embodiment, connection bay 50 may itself be movable relative to media path 56. For example, connection bay 50 may comprise a carriage configured to move unit 16 or unit 26 along a scan axis generally perpendicular to a direction in which media 14 is moved along media path 56.

Consumable resource option control unit 16 is configured to be removably connected to device 12 via connection bay 50. Unit 16 generally comprises a cartridge which includes printing material 18, applicator 20 and communication interface 66. Printing material 18 comprises material configured to be deposited upon a surface of media 14 so as to form image 54. In one embodiment, printing material 18 may comprise a particulate or powder such as toner. In another embodiment, printing material 18 may comprise a liquid, such as ink, a polymer or wax.

Applicator 20 comprises a mechanism configured to selectively deposit printing material 18 upon media 14. The configuration of applicator 20 depends upon a particular type of printing material 18 utilized by device 12. In one embodiment in which the printing material comprises toner, applicator 20 may comprise an electrophotographic printing mechanism utilizing a photoconductive drum or belt. In another embodiment in which printing material 18 comprises a liquid, such as ink, applicator 20 may comprise a plurality of fluid ejecting inkjet nozzles. In other applications, applicator 20 may have other configurations depending upon the characteristics of printing material 18.

Communication interface 66 interfaces with communication interface 64 to enable communication with controller 48. In the particular embodiment shown, communication interfaces 64 and 66 have contacts which are brought into contact with one another when unit 16 is positioned within connection bay 50. Upon connection of unit 16 to device 12, and upon initiation of a print process by a user through input 46, controller 48 generates control signals which direct media handling system 42 to position media 14 opposite applicator 20. Controller 48 further generates control signals which direct applicator 20 to form image 54 upon media 14 using predetermined printing mode.

Resource and option control unit 26 is substantially identical to resource unit 16 except that unit 26 additionally includes option key 22. In particular, unit 26 includes a printing material 18 and an applicator 20 which are substantially identical to printing materials 18 and applicator 20 of resource unit 16. However, because unit 26 includes option key 22, unit 26 additionally enables device 12 to print image 54 using substantially the same printing material and substantially the same applicator operating in an additional optional printing mode based upon different control signals from controller 48.

In the particular example shown, option key 22 comprises a memory, such as a digital electronic label, commonly referred to as an e-label. Other forms of memory may alternatively be used. The memory stores option control data. As indicated by arrows 67, this data is read by electronic circuitry of controller 48 through communication interfaces 64 and 66. As indicated by arrow 69, based upon such read information from option key 22, controller 48 generates control signals which are communicated to display 44 so as to cause display 44 to indicate that this optional mode of operation is available for use in printing image 54. A user may choose the displayed optional mode using input 46 which communicates the selection to controller 48. As a result, as indicated by arrows 71 and 73, controller 48 further generates control signals directing media handling system 42 and/or applicator 20 to print image 54 using the optional mode of operation. If a user chooses not to use the optional mode, controller 48 alternatively generates control signals which direct media handling system 42 and/or applicator 20 to print image 54 using another default printing mode.

In an alternative embodiment, in lieu of comprising a memory, option key 22 may alternatively comprise a surface configuration, such as a bar code, adapted to be read by a sensor 68 (shown in phantom) which is in communication with controller 48. For example, option key 22 may include a bar code while sensor 68 may comprise an optical bar code reader. Upon using sensor 68 to read the bar code of option key 22 and indicated by arrow 73, controller 48 generates control signals causing display 44 to indicate the optional mode of operation is available. If a user chooses the optional mode of operation using input 46, controller 48 generates control signals directing media handling system 42 and/or applicator 20 to print image 54 upon medium 14 using the optional mode.

Overall, image-forming system 10 enables the operation of device 12 to be customized with the use of consumable resources having associated option keys. For example, in one application, device 12 may be configured to form images upon print medium 14 using one of several printing modes. However, only a first subset of the printing modes are made available to general users of device 12. In contrast, specific users having unit 26 and its option key 22 may use all of the modes or a second distinct subset of the printing modes. In other embodiments, use of unit 26 and its option key 22 may eliminate the availability of certain printing modes while making other printing modes newly available. As a result, unit 26 may be distributed to control the printing modes made available to and used by certain users.

Figure 2:
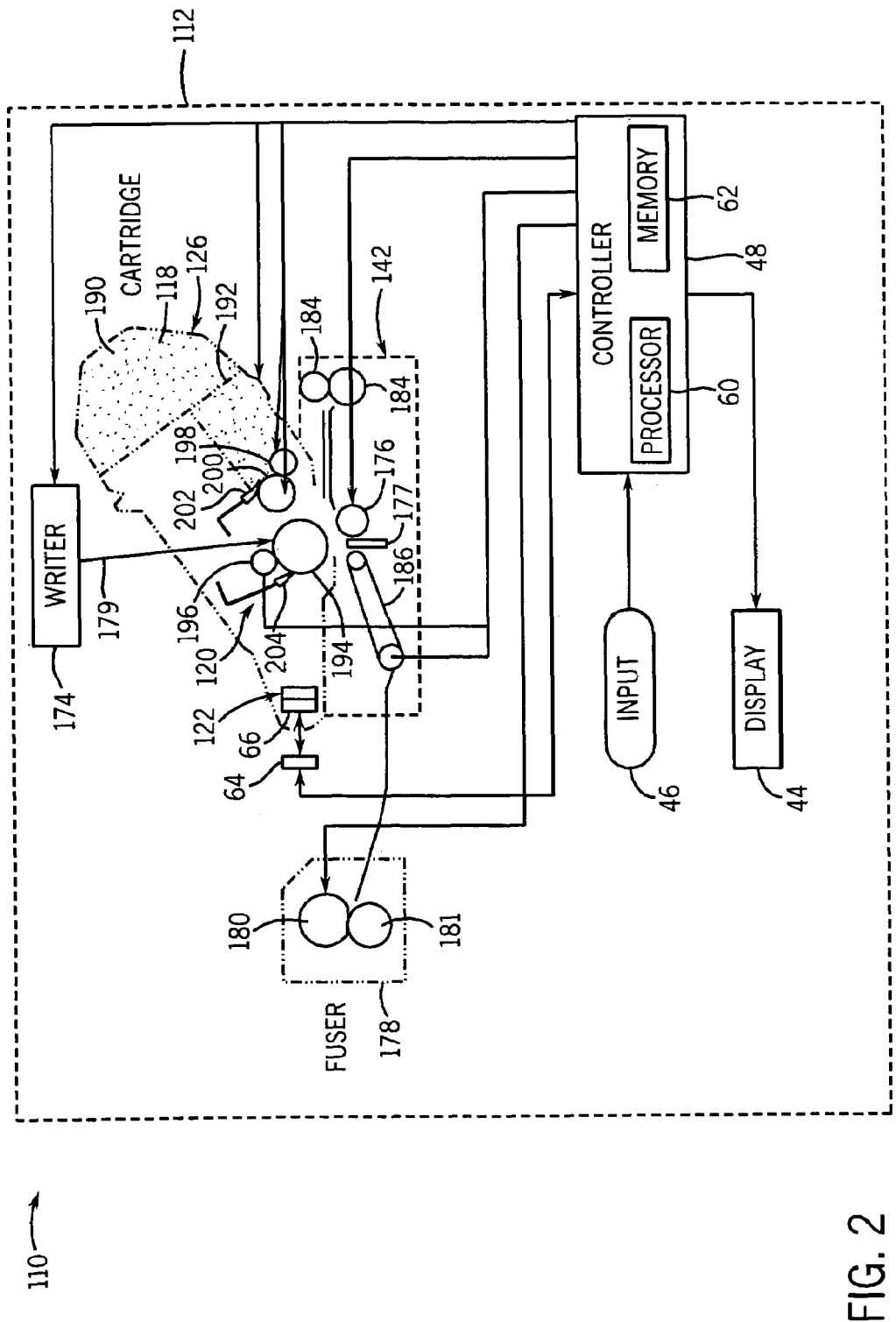
FIG. 2 is a schematic illustration of a first embodiment of the image-forming system of FIG. 1.

FIG. 2 schematically illustrates image-forming system 110, an example embodiment of image-forming system 10 shown in FIG. 1. Image-forming system 110 comprises an electrophotographic printing system which includes image-forming device 112 and consumable resource option control unit 126. Image-forming device 112 includes media bay 40 (shown in FIG. 1), media handling system 142, display 44, input 46 and controller 48 which are described above with respect to FIG. 1. Image-forming device 112 additionally includes electrophotographic write device 174, transfer roller 176, static charge eliminator 177, and fuser 178. Electrophotographic write device 174 is configured to focus and direct light upon a photoconductive surface supported by unit 126 so as to form an image upon the photoconductive surface. In one embodiment, write device 174 comprises a device configured to direct a laser beam 179 upon a photoconductive surface of unit 126. In other embodiments, other writing devices may be employed.

Fuser 178 is configured to fuse printing material, such as toner, to media to form an image on media. In the particular embodiment illustrated, fuser 178 fuses the toner to the media with heat and pressure. Fuser 178 generally includes a pressure roller 180 and a film unit 181. After the image has been permanently fused to media by fuser 178, the media is expelled by media handling system 142.

Media handling system 142 comprises a mechanism configured to transport media 14 from bay 40 relative to applicator 120 of unit 126. Media handling system 142 includes various rollers 184 and a belt 186 configured to transport media 14 from bay 40 across applicator 120 to fuser 178. Various other media transport mechanisms may be employed in lieu of the one schematically shown.

As further shown by FIG. 2, unit 126 generally comprises a cartridge which forms a supply hopper 190 and a toner chamber 192 which contain printing material 118 that generally comprises toner. Hopper 190 and chamber 192 supply material 118 to applicator 120.

Applicator 120 applies material 118 to media 14. Applicator 120 includes photoconductive drum 194, charging roller 196, supply roller 198, developer roller 200, blade 202, and cleaner blade 204. Photoconductive drum 194 comprises a drum having a photoconductive surface which is electrically charged by charging roller 196. As indicated by the arrow of laser beam 179, write device 174 directs light upon the surface of photoconductive drum 196 to form a charged image upon the photoconductive surface. Supply roller 198 and developer roller 200 cooperate to deliver printing material 118 from toner chamber 192 to drum 194. Blade 202 removes excess material 118 from developer roller 200.

Transfer roller 176 facilitates the transfer of material 118 from drum 194 to media 14. Thereafter, the static charge upon drum 194 is removed by static charge eliminator 177. Once residue toner on drum 194 is cleaned by blade 204, charging roller 196 once again charges the surface of drum 194. Once the toner has been transferred to media 14, media handling system 142 further transports the media to fuser 178.

Figure 4:
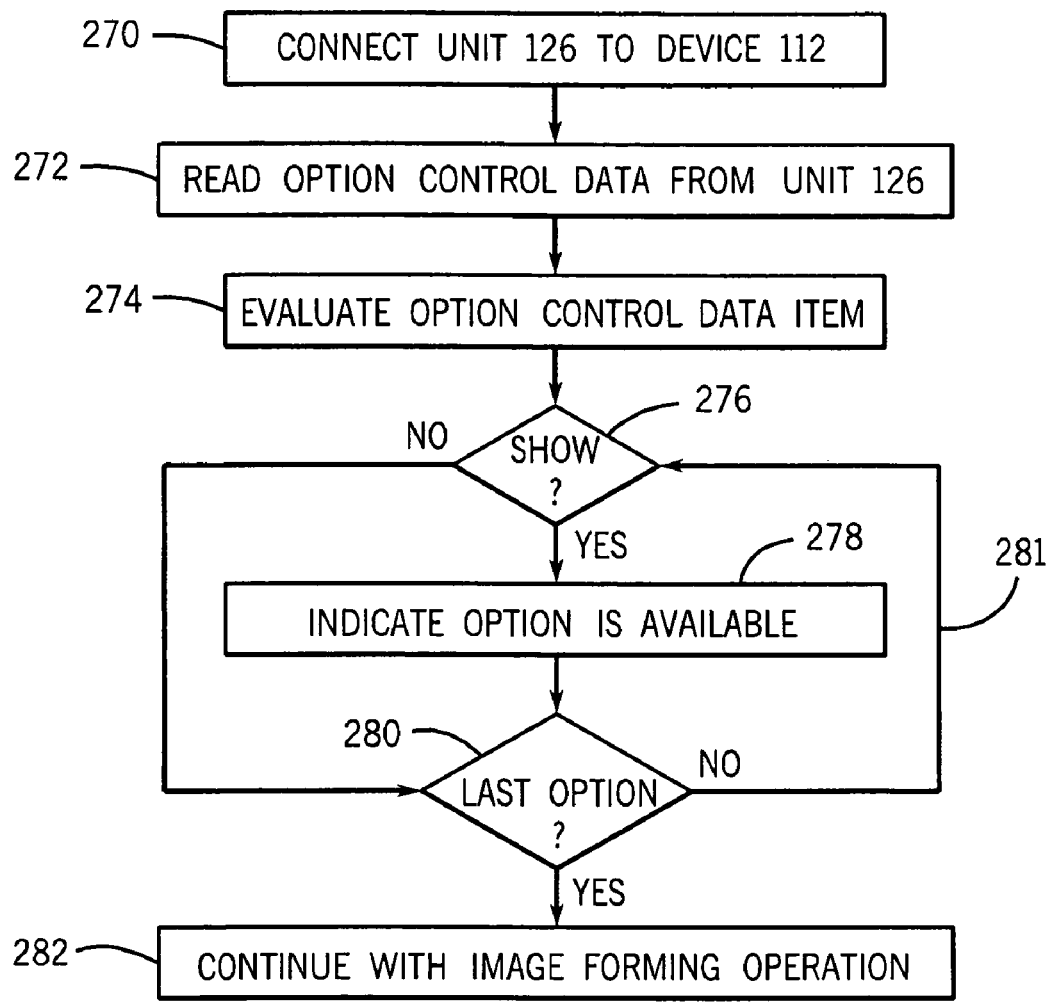
FIG. 4 is a flowchart illustrating logic performed by the image-forming system of FIG. 2 according to one exemplary embodiment.

Option key 122 comprises a memory coupled to a remainder of unit 126. Option key 122 stores written instructions or option logic. FIG. 4 schematically illustrates option control data stored in the memory of option key 122. In the example shown, option key 122 instructs controller 48 to generate a control signal such that display 44 shows that mode one is available and that mode two is not available. In the particular example shown, option control data of option key 122 further instructs controller 48 to enable mode 1 and to disable mode 2. As indicated by FIG. 4, option key 122 may be configured to enable and to disable multiple modes or options for the operation of image-forming device 112.

In the particular embodiment illustrated, option key 122 comprises an e-label for storing such option control data. The e-label may also be configured to store other information relating to unit 126 such as characteristics of print material 118, the age of material 118, the amount of material 118 extracted from unit 126, the number of copies or amount of media 14 which has been printed using unit 126 and the amount of material 118 within unit 126. The e-label is generally an electronic chip that is manufactured into the cartridge. In other embodiments, option key 22 may have other configurations and may comprise other forms of memory.

FIG. 4 is a flow chart illustrating the steps performed by device 112 when consumable resource option control unit 126 is connected to device 112. As indicated by step 270 in FIG. 5, the connection of unit 126 to device 112 is sensed by communication interface 64 (shown in FIG. 2) which transmits signals to processor 60. Processor 60 consults option logic of memory 62. As indicated by step 272, based upon the instructions provided by the option logic, processor 60 generates control signals which cause communication interface 66 to read option control data upon memory of option key 122 of unit 126.

As indicated by step 274, processor 60 consults option logic of option key 122 for instructions on evaluating the option control data (shown in FIG. 3). In particular, processor 60 determines from option control data whether print mode 1 should be shown as indicated by step 276. In the particular example illustrated, the option control data specifies that print mode 1 should be shown. As a result, processor 60 generates control signals which cause user display 44 to add or otherwise indicate that print mode 1 is available as indicated by step 278.

As indicated by step 280 and arrow 281, processor 60 continues to generate control signals which cause communication interface 66 to consult option key 122 to determine whether additional options are identified by the option control data.

If additional options are identified by option control data, processor 60 generates control signals which cause communications interface 66 to read a state of the next identified print mode (mode 2 for purposes of discussion) through interface 66. Thus, steps 276-280 are repeated for option 2, as needed.

In the particular example illustrated, the option control data specifies that option 2 should be hidden. As a result, at step 276, processor 60 does not generate control signals which would otherwise cause option 2 to be indicated as available by display 44. As shown by step 280, processor 60 proceeds by once again reading menu control data to determine whether an additional option is identified. This process is repeated until the last print mode identified by option control data has been evaluated.

As indicated by step 282, once the last option item has been evaluated, processor 60 generates control signals to continue with image-forming operations. In particular, processor 60 awaits input from the user selecting one or more of the available options. In response to receiving one or more signals based upon the user's selection, processor 60 consults the printing logic to generate control signals that cause an image to be formed upon a print medium based upon the user's selected option or options.

According to one particular example, the consumable resource option control unit 126 comprises a toner cartridge containing In one example embodiment, the option control data results in display 44 indicating that a toner conservation mode is available, wherein the printing logic instructs processor 60 to generate control signals such that applicator 120 and transfer roller 126 operate in a mode so as to conserves toner which may result in slightly lower quality images. The option control data may additionally instruct processor 60 to hide or not display that a second option permitting higher toner usage with improved image quality is available. In the particular example illustrated, display 44 indicates available options in the form of a list or menu.

Figure 5:
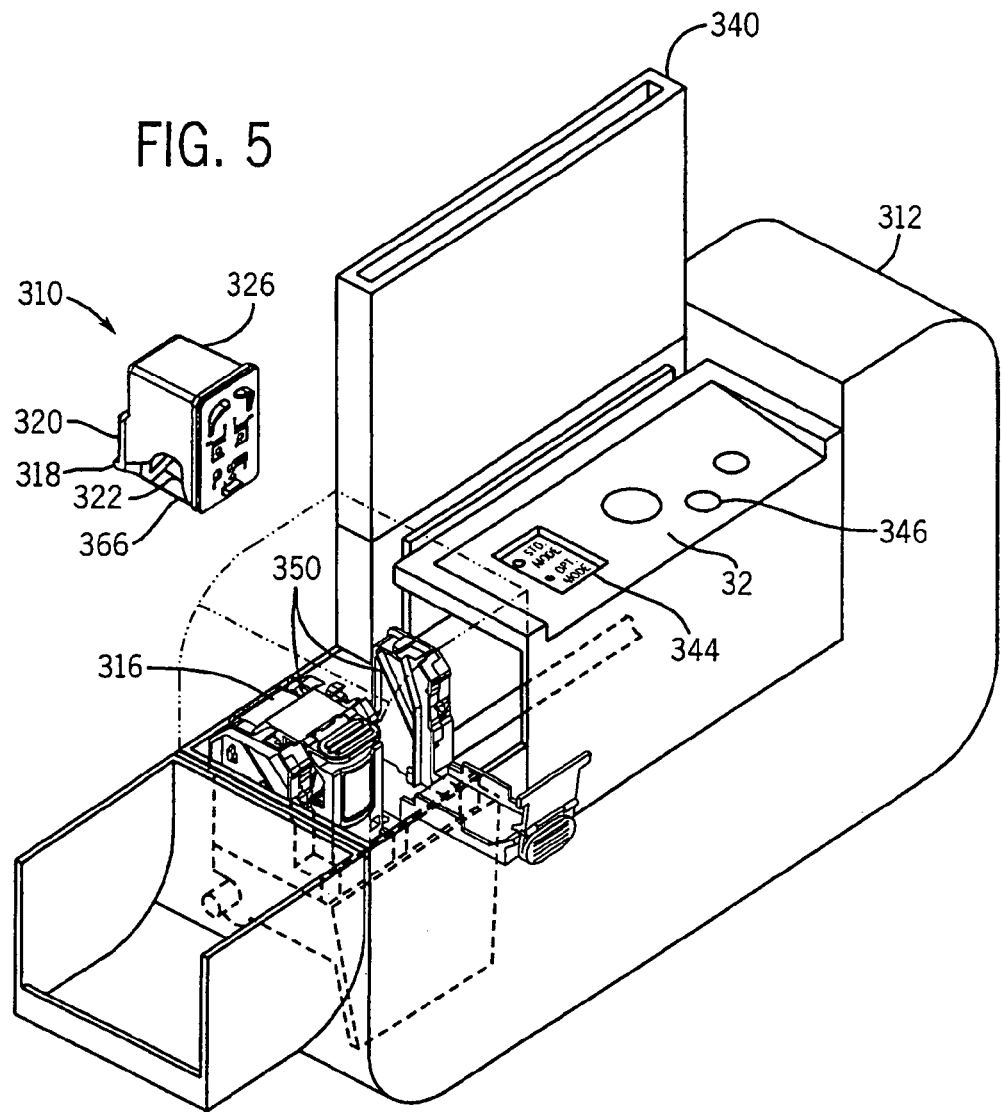
FIG. 5 is a schematic illustration of a second embodiment of the image-forming system of FIG. 1 according to an exemplary embodiment.

FIG. 5 illustrates an image-forming system 310, another specific embodiment of image-forming system 10 of FIG. 1. Image-forming system 310 includes forming device 312, resource unit 316 and consumable resource option control unit 326. Image-forming device 312 includes media bay 340, media handling system 42 (shown and described with respect to FIG. 1), display 344, input 346, controller 48 (shown and described above with respect to image-forming device 12 in FIG. 1) and unit connection bay 350. As shown by FIG. 5, media bay 340 comprises an opening into which media, such as sheets of paper, are fed to handling system 42. Handling system 42 comprises a series of rollers and belts which are driven to move the media 14 (shown in FIG. 1) relative to unit 326. Display 344 comprises an LCD screen configured to display options for modes of operation for image-forming device 312 and unit 326. Input 46 comprises push buttons, enabling a user to select an optional printing mode. Unit connection bay 350 generally comprises a carriage movable in a direction generally perpendicular to the direction in which media 14 is fed and moved by media handling system 42. Connection bay 350 is configured to removably receive unit 316 and unit 326.

Resource unit 316 and consumable resource option control unit 326 are substantially identical to one another in that both resource unit 316 and consumable resource option control unit 326 include printing material 318 which constitutes a fluid such as ink and applicator 320 which constitutes a plurality of fluid-ejecting nozzles. Both units 316 and 326 further include a communication interface 366. In the embodiment shown, printing material 318 contained within unit 326 has a different color or pigment than the printing material contained within unit 326.

Unlike unit 316, consumable resource option control unit 326 additionally includes option key 322. Option key 322 comprises an acumen or e-label affixed as part of unit 326. Option key 322 includes code or instructions configured to be read by controller 48 (shown in FIG. 1) which cause controller 48 to enable an additional optional printing mode and to further cause or generate control signals causing display 344 to indicate the availability of the optional printing mode. Communication interface 366 comprises a set of electrical contacts electrically connected to option key 322 and configured to make electrical contact with corresponding contacts (not shown) provided in connection bay 350 and in communication with controller 48 (shown in FIG. 1).

Figure 6:
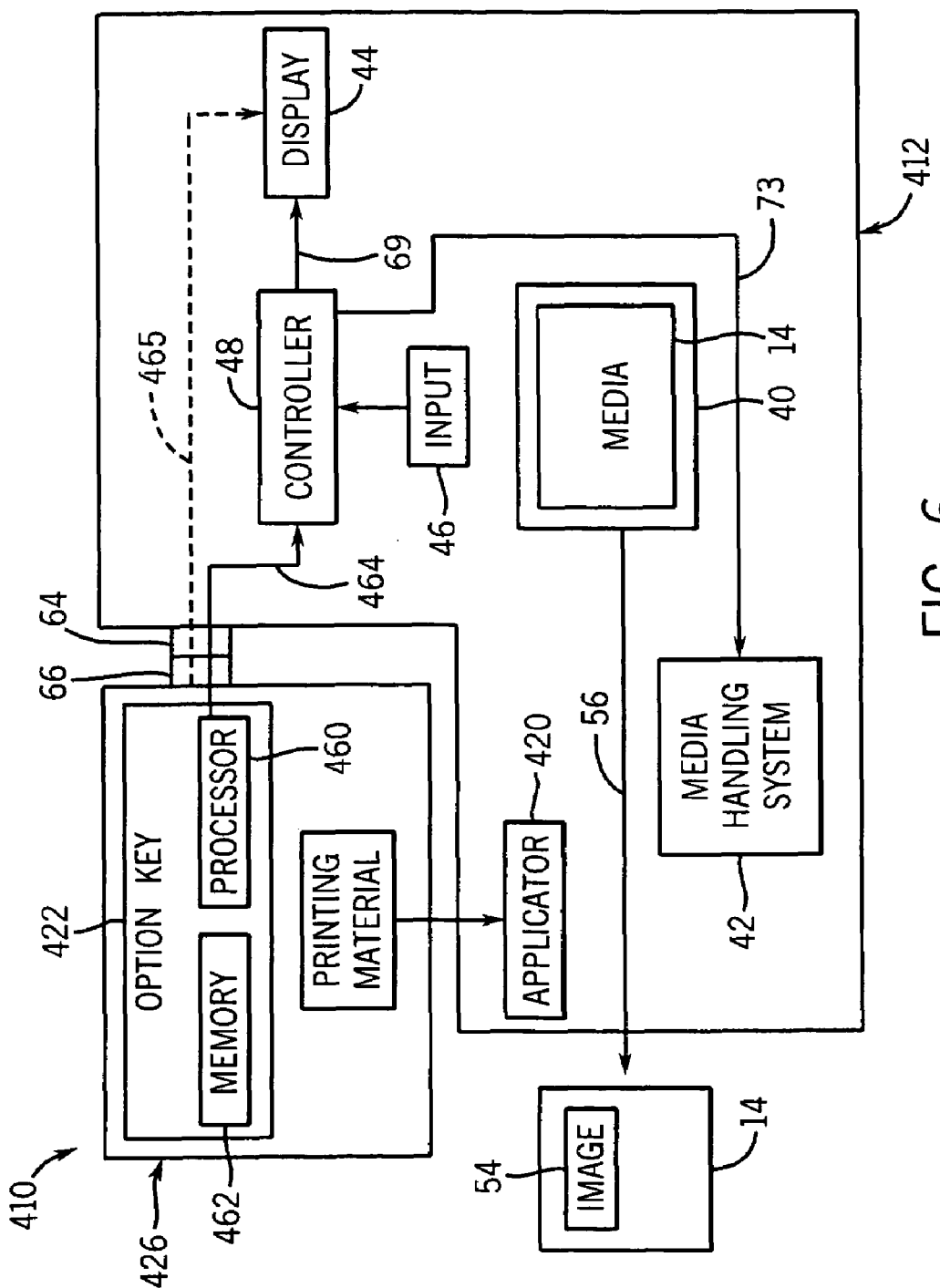
FIG. 6 is a schematic illustration of a third embodiment of the image-forming system of FIG. 1 according to an exemplary embodiment.

FIG. 6 schematically illustrates image-forming system 410, another embodiment of image-forming system 10 shown in FIG. 1. Image-forming system 410 includes device 412 and consumable resource option control unit 426. Image-forming device 412 is similar to image-forming device 12 except that image-forming device 412 contains applicator 420. Consumable resource option control unit 426 is similar to unit 26 except that unit 426 omits applicator 20 and includes option key 422 in lieu of option key 22. Those remaining elements of image-forming device 412 and unit 426 which are similar to the corresponding elements of image-forming device 12 and option control unit 26 are numbered similarly.

Like applicator 20, applicator 420 is configured to apply printing material 18 to media 14 as media 14 is being handled by system 42. In one embodiment, applicator 420 may comprise an electrophotographic imaging system having a photoconductive member, such as a belt or drum. In one embodiment, applicator 420 may be similar to applicator 120 (shown in FIG. 2) except that components such as photoconductive drum 194, changing roller 196 and blade 204 are supported and housed as part of image-forming device 412 rather than as part of unit 426. In other embodiments, applicator 420 may comprise an electrophotographic imaging system having other configurations. In such an embodiment, unit 426 comprises a material cartridge which supplies material, such as toner, to the photoconductive drum upon being connected to device 412.

In another embodiment, applicator 420 may comprise one or more printheads having a plurality of fluid-ejecting inkjet nozzles which are mounted to and formed as part of image-forming device 412. In such an embodiment, unit 426 comprises a remote fluid supply such as an off-axis ink supply removably connected to applicator 420.

Option key 422 is similar to option key 22 except that option key 422 includes both a processor 460 and memory 462. Processor 460 reads memory 462 and transmits instructions via electrical signals (indicated by arrow 464) to controller 48, enabling or disabling certain modes of operation and further directing controller 48 to generate control signals causing display 44 to indicate the availability or unavailability of one or more options. As indicated by broken line 465, processor 462 may generate control signals which are transmitted directly to display 44 to indicate the availability or unavailability of certain modes of operation.

Figure 7:
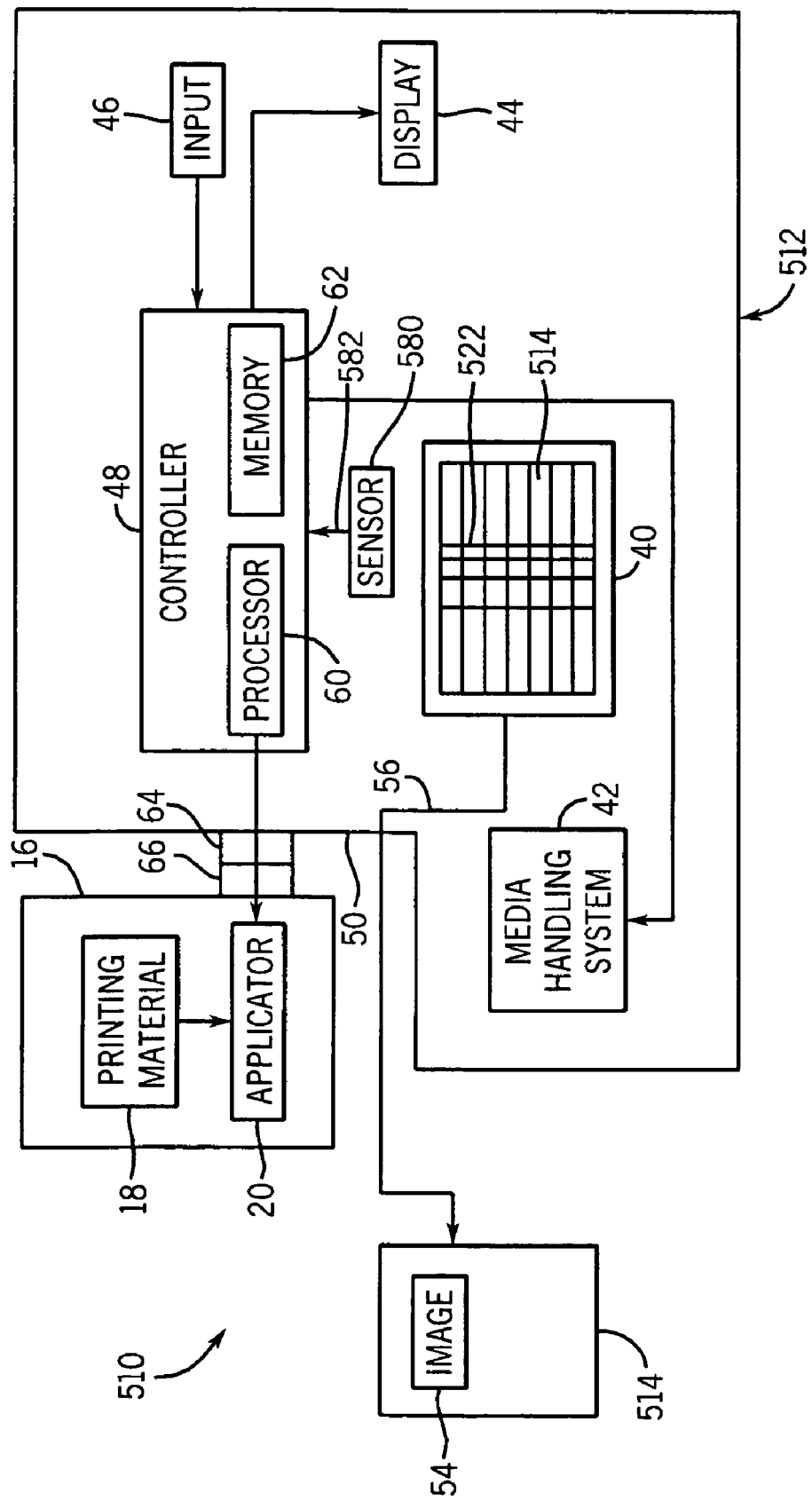
FIG. 7 is a schematic illustration of a fourth embodiment of the image-forming system of FIG. 1 according to an exemplary embodiment.

FIG. 7 schematically illustrates image-forming system 510, another embodiment of image-forming system 10. Image-forming system 510 includes image-forming device 512, media 514 and resource unit 16 (described with respect to FIG. 1). Media 514 is similar to media 14 except that media 514 additionally has an associated option key 522. Option key 522 comprises markings or other materials or members affixed to media 514. In the embodiment shown, option key 522 comprises markings along a side of a stack or ream of individual sheets of media 514. The markings have a predefined pattern which corresponds to enablement of a particular print mode for image-forming device 512. In other embodiments, in lieu of option key 522 being formed along the side of the sheets of media 514, option key 522 may alternatively be formed along a side of a roll of media or may be formed upon the face of media 514.

Image-forming device 512 is similar to image-forming device 12 except that image-forming device 512 additionally includes sensor 580. Sensor 580 comprises a device configured to read option key 522 upon media 514. In the particular embodiment shown, sensor 580 is configured to read option key 522 while media 514 is within media bay 40. In other embodiments, sensor 580 may be configured to read option key 522 while media 514 is along media path 56. In the particular embodiment shown, sensor 580 comprises an optical sensor configured to sense and read the markings of option key 522. The read markings of option key 522 are communicated to controller 48 as indicated by arrow 582. Processor 60 of controller 48 processes the read markings of option key 522 and consults memory 62 which stores one or more printing modes for image-forming system 510 which are to be enabled or disabled upon the reading of corresponding option keys associated with media 515. For example, processor 60 of controller 48 may compare option key 522 with a database (not shown) of various data/codes stored as a look-up table to determine that the option key 522 associated with the particular media 514 authorizes printing mode one. Controller 60 generates control signals directing display 44 to indicate to a user that printing mode one is available. If a user selects printing mode one via input 46, processor 60 generates control signals directing media handling system 42 and/or applicator 20 to print upon media 514 using printing mode one. If a user does not select the option made available by option key 522, processor 60 of controller 48 may alternatively generate control signals directing media handling system 42 and/or applicator 20 to form image 54 using a pre-established or a default printing mode.

Overall, option keys 22, 122, 322 and 522, which are coupled or associated with resources that are consumed or wear out upon or during the printing of images upon print media, serve as keys for unlocking or making available special printing options embedded in a printer or image-forming device. As a result, consumable resources may be distributed such that different users are given different image-forming options or techniques that are customized to the objectives of the different users or the suppliers of such image-forming systems.

Although the present invention has been described with reference to example embodiments, workers skilled in the art will recognize that changes may be made in form and detail without departing from the spirit and scope of the invention. Those skilled in the art will appreciate that certain of these advantages can be obtained separately through reconfiguring the foregoing structure without departing from the spirit and scope of the present invention. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. An image-printing device comprising:
    a connection bay configured to accept an insertable consumable resource, wherein the consumable resource is coupled to an option key that is configured to operatively identify at least one mode of operation associated with the consumable resource that is selectively employable in forming a printed image, wherein the connection bay is configured to output at least one signal associated with the at least one mode of operation when the consumable resource is inserted wherein the at least one mode of operation made selectable by the option key is decreasing print quality of the printed image that would otherwise not be selectable for use of the same consumable resource not including the option key; and
    a controller operatively coupled to the connection bay and configured to receive the at least one signal associated with the at least one mode of operation and in response output display information suitable for use by a display to visually indicate a selectable availability of the at least one mode of operation.

2. The image-printing device of claim 1 further comprising:
    a display operatively coupled to the controller and configured to receive the output display information and in response visually indicate the selectable availability of the at least one mode of operation.

3. The image-printing device of claim 2 including: an input mechanism operatively coupled to the controller and configured to output at least one mode of operation selection signal associated with a selected mode of operation, wherein the controller is configured to receive the at least one mode of operation selection signal and in response employ the selected mode of operation in forming the printed image.

4. The image-printing device of claim 1, wherein the connection bay is configured to output the at least one signal associated with the at least one mode of operation by operatively accessing memory of the option key that is configured to store option control data indicative of the at least one mode of operation associated with the consumable resource.

5. The image-printing device of claim 1, wherein the connection bay is configured to output the at least one signal associated with the at least one mode of operation by operatively communicating with a processor of the option key that is configured to indicate the at least one mode of operation associated with the consumable resource.

6. The image-printing device of claim 1, wherein the connection bay is configured to output the at least one signal associated with the at least one mode of operation by operatively sensing a surface configuration of the option key that is configured to indicate the at least one mode of operation associated with the consumable resource.

7. The image-printing device of claim 1, wherein the connection bay is further configured to receive at least one printing material from the consumable resource comprising when inserted, the at least one printing material being selected from a group of printing materials comprising an ink, a toner, and a print medium.

8. The image-printing device of claim 7, wherein the connection bay is configured to accept a cartridge containing the at least one printing material as the insertable consumable resource.

9. The image-printing device of claim 1, wherein the selectable availability of the at least one mode of operation is associated with increasing print quality of the printed image.

10. The image-printing device of claim 1, wherein the connection bay is configured to accept a cartridge containing the at least one printing material as the insertable consumable resource.

11. A system comprising:
    an insertable consumable resource coupled to an option key that is configured to operatively identify at least one mode of operation associated with the consumable resource that is selectively employable in forming a printed image;
    a display capable of visually indicating a selectable availability of the at least one mode of operation;
    a connection bay operatively coupled to the option key and configured to output at least one signal associated with the at least one mode of operation; and
    a controller operatively coupled to the connection bay and the display, and configured to receive the at least one signal associated with the at least one mode of operation and in response output display information to the display to visually indicate a selectable availability of the at least one mode of operation, wherein the at least one mode of operation made selectable by the option key is decreasing print quality of the printed image that would otherwise not be selectable for use of the same consumable resource not including the option key.

12. The system of claim 11 further comprising:
    an input mechanism operatively coupled to the controller and configured to output at least one mode of operation selection signal associated with a selected mode of operation; and wherein the controller is further configured to receive the at least one mode of operation selection signal and in response employ the selected mode of operation in forming the printed image.

13. The system of claim 11, wherein the option key includes memory that is configured to store option control data indicative of the at least one mode of operation associated with the consumable resource, and the connection bay is configured to output the at least one signal associated with the at least one mode of operation by operatively accessing the memory.

14. The system of claim 11, wherein the option key includes a processor that is configured to indicate the at least one mode of operation associated with the consumable resource, and the connection bay is configured to output the at least one signal associated with the at least one mode of operation by operatively communicating with the processor.

15. The system of claim 11, wherein the option key includes a surface configuration that is configured to indicate the at least one mode of operation associated with the consumable resource, and the connection bay is configured to output the at least one signal associated with the at least one mode of operation by operatively sensing the surface configuration.

16. The system of claim 11, wherein the consumable resource includes at least one printing material selected from a group of printing materials comprising an ink, a toner, and a print medium, and wherein the connection bay is further configured to receive the at least one printing material from the consumable resource.

17. The system of claim 11, wherein the consumable resource includes a cartridge containing the at least one printing material.

18. The system of claim 11, wherein the selectable availability of the at least one mode of operation is associated with increasing print quality of the printed image.

19. A method for allowing a user to select a mode of operation for use in printing an image using an image-printing device, the method comprising:
   determining at least one mode of operation associated with a consumable resource using an option key associated with the consumable resource;
   indicating that the at least one mode of operation is available for selection; and
   receiving user input selective of the indicated at least one mode of operation, wherein the at least one mode of operation made selectable by the option key is decreasing print quality of the printed image that would otherwise not be selectable for use of the same consumable resource not including the option key.

20. The method of claim 19, wherein determining the at least one mode of operation associated with the consumable resource using the option key further includes:
   accessing memory within the option key that is configured to store option control data indicative of the at least one mode of operation associated with the consumable resource.

21. The method of claim 19, wherein determining the at least one mode of operation associated with the consumable resource using the option key further includes:
   sensing a surface configuration of the option key that indicates the at least one mode of operation associated with the consumable resource.

22. The method of claim 19, wherein the consumable resource includes at least one printing material selected from a group of printing materials comprising an ink, a toner, and a print medium.

23. The system of claim 22, wherein the consumable resource includes a cartridge containing the at least one printing material.

24. The method of claim 19, wherein indicating that the at least one mode of operation is available for selection further includes:
   visually displaying information associated with the at least one mode of operation.

25. A system comprising:
   insertable means for providing a consumable resource to an image-printing device and identifying to the image-printing device at least one mode of operation associated with the consumable resource that is selectively employable by the image-forming device in forming a printed image;
   means for indicating a selectable availability of the at least one mode of operation to a user, wherein the at least one mode of operation made selectable by the means for indicating is decreasing print quality of the printed image that would otherwise not be selectable for use of the same consumable resource not including the means for indicating;
   means for receiving user input selecting the at least one indicated mode of operation; and
   means for employing the at least one selected mode of operation while forming the printed image.

26. The system of claim 25, wherein the consumable resource includes at least one printing material selected from a group of printing materials comprising an ink, a toner, and a print medium.

27. The image-printing device of claim 1, wherein the consumable resource comprises a cartridge containing a printing material configured to be deposited upon a print medium.

28. The image-printing device of claim 1, wherein the availability of the at least one mode of operation associated with the consumable resource is not displayed unless the consumable resource having the option key is inserted into the connection bay.

29. The image-printing device of claim 1, wherein the option key remains with the consumable resource upon removal of the consumable resource from the connection bay.

30. The system of claim 11, wherein the consumable resource comprises a cartridge containing a printing material configured to be deposited upon a print medium.

31. The system of claim 11, wherein the availability of the at least one mode of operation associated with the consumable resource is not displayed unless the consumable resource having the option key is inserted into the connection bay.

32. The system of claim 11, wherein the option key remains with the consumable resource upon removal of the consumable resource from the connection bay.

* * * * *